Patented Oct. 30, 1945

2,387,841

UNITED STATES PATENT OFFICE 2,387,841

VINYL RESIN COMPOSITIONS

Rudolph M. Goepp, Jr., New Castle, Del., assignor to Atlas Powder Company, Wilmington, Del., a corporation of Delaware No Drawing. Application September 27, 1944, Serial No. 556,077

10 Claims. (Cl. 260—36)

The present invention relates to vinyl resin compositions and, more particularly, to compositions of vinyl resins of the class polyvinyl chloride, polyvinyl chloride-acetate, and polyvinyl butyral.

An object of the invention is to provide novel plastic compositions comprising vinyl resins of the class defined.

The compositions of the invention comprise polyvinyl chloride, polyvinyl chloro-acetate, or polyvinyl butyral, and an ester of the type

wherein

H is the divalent hexide residue ($C_6H_8O_4$)
$R^1$ is the acyl radical of a saturated fatty acid with from 2 to 10 carbon atoms,
$R^2$ is the acyl radical of a saturated fatty acid with from 4 to 10 carbon atoms, and
The sum of the carbon atoms in $R^1$ and $R^2$ is at least 6 and not greater than 18.

The hexides are dihydric compounds with two oxygen-containing rings and having the empirical formula $C_6H_{10}O_4$. They are commercially derived from the hexitols by an anhydrizing reaction, in consequence of which the hexides are named, by reference to the hexitols from which they can be formed, by changing the suffix itol to ide. Thus, mannitol yields mannide, sorbital yields sorbide, dulcitol yields dulcide, etc. Each of the hexitols is capable of forming a number of isomeric hexides. In this application, the terms "mannide," "sorbide," etc., are employed in the generic sense to cover all isomeric hexides formed from the respective hexitols.

The esters in this group are high boiling compounds with low volatilities, low water solubilities, good resistance to hydrolysis, high compatibilities and plasticizing effect on a number of plastics. They are oily liquids that can readily be incorporated into plastic formulations to prepare lacquers, films, molded articles and the like.

The fatty acids that can be used are the straight and branched chain saturated fatty acids with 2 to 10 carbon atoms, such as acetic, propionic, butyric, isobutyric, valeric, isovaleric, caproic, 2-ethylbutyric, heptoic, caprylic, 2-ethyl hexoic, pelargonic, and capric. Anhydrides, such as acetic or propionic anhydride, can be used in preparing the esters.

The esters of the invention can be prepared by reacting the hexide with at least two equivalents of the fatty acid or acid anhydride in the presence of an esterifying catalyst, such as sulfuric acid, and/or by refluxing with a water-removing liquid. Alternatively the esters can be prepared by reacting two equivalents of the acid with a hexitol or a hexitan at elevated temperature in the presence of a catalyst such as sulfuric acid, for a time sufficient to remove water from the hexitol or hexitan to form the hexide and simultaneously cause esterification with the fatty acid. Other methods of preparation can be used but these two types are preferred.

Where mixed esters, for example sorbide octoatepropionate, are to be made, it is preferable to form the monoester of the longer chain acid first and then complete the esterification with the shorter chain acid.

One of the advantages of the esters of this invention is their lack of toxicity in food packaging and the like. For example resinous coatings for food packages can safely include these esters as plasticizers, and plastic films for food wrapping can likewise include these esters.

The following examples are illustrative of typical preparations of the esters of the type used in this invention.

EXAMPLE I

Isomannide dibutyrate 146 grams crystalline isomannide, 190 grams butyric acid, 15 ml. toluene, and 0.5 ml. concentrated sulfuric acid were heated together with continuous agitation. The water formed was removed as a constant boiling mixture with the toluene. Reaction was continued until no further evolution of water was noted at which time 35.5 ml. of water had been collected (calculated 36 ml. water).

The reaction product was then washed with sodium carbonate solution until the excess acid was removed, followed by a water wash to remove the sodium carbonate.

After evaporating the toluene under vacuum 256 grams of product were obtained having a hydroxyl number of 0 and a saponification value of 355.

This product was 100% compatible with polyvinyl acetate, polyvinyl chloride, polyvinyl chloride-acetate, and polyvinyl butyral. In a volatility test it had a weight loss of 9% after being held for 120 hours at 105° C.

EXAMPLE II

Sorbide caprylate-propionate 150 grams sorbide, 157 grams caprylic acid and 150 ml. toluene were heated together with agitation. The water formed was removed as a constant boiling mixture with toluene. After 24 ml. water had been collected (by separation from toluene), 90 grams propionic acid were added and reaction continued to completion.

After removal of the toluene 295 grams of product remained as an oily liquid ester, nearly insoluble in water.

EXAMPLE III

*Sorbide di-2-ethyl butyrate*

225 grams sorbide, 365 grams 2-ethylbutyric acid and 150 ml. toluene were heated together with agitation. The water formed in the reaction was removed as a constant boiling mixture with toluene.

After removing the toluene there remained 461 grams of product which was an oily liquid with a viscosity of 67 centipoises at 25° C. The ester had a bitter taste. 100 grams of water at 25° C. dissolve only 0.2 gram of ester.

EXAMPLE IV

*Sorbide di-caprylate*

150 grams sorbide, 315 grams caprylic acid and 150 ml. toluene were heated together with agitation. The water formed in the reaction was removed as a constant boiling mixture with toluene.

After removing the toluene, there remained 388 grams of product which was an oily liquid with a viscosity of 52 centipoises at 25° C. This ester had a bitter-fatty taste. 100 grams of water at 25° C. dissolve less than 0.1 gram of the ester.

EXAMPLE V

*Sorbide di-butyrate*

375 grams crystalline sorbitol, 370 grams butyric acid, 1 ml. concentrated sulfuric acid and 200 ml. toluene were heated together with agitation. The water formed in the reaction was removed as a constant boiling mixture with toluene.

After removing the toluene there remained 415 grams of product which was an oily liquid. The ester had a bitter, slightly sour taste. 100 grams of water at 25° C. dissolve 0.4 gram of the ester.

The other esters of the invention can be made by similar processes using the selected acid or acids and hexide, hexitol or hexitan. Further esters that can be made by these processes are, for example, sorbide acetate-propionate, sorbide di-propionate, sorbide di-caproate (di-hexoate), sorbide di-2-ethyl hexoate, mannide decoate propionate, sorbide caproate propionate, sorbide di-pelargonate, etc.

The compositions of the invention can be made by combining the ester and the vinyl resin by the usual compounding methods such as by milling or by means of dissolving in mutual solvents. The esters are compatible with polyvinyl chloride, polyvinyl chloride-acetate and polyvinyl butyral over a wide range of proportions, many of the combinations being miscible in all proportions, thus giving the formulator a range of plastic compositions from which to select the most suitable for a given purpose. Instead of using single esters as plasticizers, mixtures of two or more can be used. Also mixtures of one or more of these esters with conventional plasticizers offer advantages for some uses.

The plastic compositions of the invention are stable due to the low volatility, low water-solubility and resistance to hydrolysis of the esters employed. They also have good stability to the action of light so that the plastic properties are retained after long exposure to light.

Films of the plastic compositions according to the invention were prepared and tested as follows:

EXAMPLE A

A stock solution was prepared of polyvinyl chloride ("Vinylite" grade "QYNA" of Carbide and Carbon Chemicals Corporation) 5 parts by weight in 95 parts of mesityl oxide. Tests were made by dissolving 0.83 part of the ester to be tested in 50 parts of the stock solution. The resulting solution was then cast on a glass plate by means of a doctor blade adjusted so that the film had a wet thickness of 0.03 inch. The plate and film were dried at 25° C. overnight and were then dried at 110° C. for one hour. Following this drying, the films, now composed of polyvinyl chloride plus 33⅓% of the ester, were stripped off the plate and cut into strips ½ inch wide. Tensile strength and elongation measurements were then made on the plasticized strips. The results of these measurements are reported below in the table.

*Table A*

| Ester | Tensile strength | Elongation | Compatibility |
|---|---|---|---|
| | Lbs./inch$^2$ | Per cent | Per cent |
| Isomannide dibutyrate | 3,400 | 285 | 100 |
| Sorbide acetate-butyrate | 5,700 | 150 | 100 |
| Sorbide dicaproate | 2,100 | 215 | 100 |
| Sorbide dicaprylate | 2,600 | 330 | 100 |
| Sorbide captylate-propionate | 2,400 | 170 | 100 |
| Sorbide di-2-ethyl hexoate | 3,600 | 295 | 100 |

EXAMPLE B

A stock solution was prepared of polyvinyl chloride-acetate ("Vinylite" grade "VYHH" of Carbide and Carbon Chemicals Corporation) 18.8 parts by weight in 48.2 parts cyclohexanone and 32.9 parts toluene. Tests were made by dissolving 3.13 parts of the ester to be tested in 50 parts of the stock solution. Films were cast, dried and cut into strips as in Example A. Tensile strength and elongation measurements were made on the plasticized strips which were composed of the polyvinyl chloride-acetate plus 33⅓% plasticizer. The results of these tests are also reported below in the table.

*Table B*

| Ester | Tensile strength | Elongation | Compatibility |
|---|---|---|---|
| | Lbs./inch$^2$ | Per cent | Per cent |
| Sorbide butyrate-acetate | 4,300 | 170 | 100 |
| Sorbide dibutyrate | 2,900 | 240 | 100 |
| Sorbide dicaproate | 2,500 | 335 | 100 |
| Sorbide dicaprylate | 2,900 | 345 | 100 |
| Sorbide caprylate-propionate | 3,100 | 335 | 100 |
| Sorbide di-2-ethyl hexoate | 3,400 | 205 | 100 |

EXAMPLE C

A stock solution was prepared by dissolving 15 parts by weight of polyvinyl butyral ("Vinylite" grade "XYSG" of Carbide and Carbon Chemicals Corporation) in 85 parts of denatured ethanol (Formula #30). Tests were made by dissolving 2.5 parts by weight of the ester to be tested in 50 parts of the stock solution. Films were prepared and tested as in Example A. These films contained 33⅓% plasticizer based on the polyvinyl butyral. The results of the tests are included in the table which follows.

*Table C*

| Ester | Tensile strength | Elongation | Compatibility |
|---|---|---|---|
| | Lbs./inch² | Per cent | Per cent |
| Sorbide butyrate-acetate | 4,900 | 290 | 100 |
| Isomannide dibutyrate | 3,700 | 290 | 100 |
| Sorbide dicaproate | 3,300 | 280 | 75 |
| Sorbide caprylate-propionate | 4,800 | 345 | 75 |
| Sorbide di-2-ethyl butyrate | 4,500 | 310 | 100 |
| Sorbide di-2-ethyl hexoate | 4,200 | 330 | 100 |

The compositions of the invention are compatible on hot milling, for example, at 120° C.

The plastic compositions of the invention are useful for many purposes. They may be used, for example, in the form of sheets, coating compositions, or formed shapes. In formulating the final product fillers, pigments, waxes and the like can be incorporated in accordance with the usual practice.

Plastic compositions comprising vinyl chloride-acetate copolymer and hexide di-pelargonates have been found to possess valuable properties, particularly with respect to the retention of plasticity at low temperatures. The properties of this plastic combination are employed advantageously in the preparation of coated fabrics which are used to make weather resisting clothing and coverings.

As will be understood by those skilled in the art, it is not necessary to use the ester plasticizers in a pure form, and in fact, it is often advantageous to use mixtures or unpurified reaction products instead of single chemical compounds.

What is claimed is:

1. A plastic composition comprising a resin selected from the group consisting of polyvinyl chloride, polyvinyl chloride-acetate, and polyvinyl butyral, and as a plasticizer for said resin a hexide diester of the type

wherein

H is the divalent hexide residue ($C_6H_8O_4$)
$R^1$ is the acyl radical of a saturated fatty acid with from 2 to 10 carbon atoms
$R^2$ is the acyl radical of a saturated fatty acid with from 4 to 10 carbon atoms, and
The sum of the carbon atoms in $R^1+R^2$ is at least 6 and not greater than 18.

2. A plastic composition comprising a polyvinyl chloride resin and as a plasticizer therefor a hexide diester of the type

wherein

H is the divalent hexide residue ($C_6H_8O_4$)
$R^1$ is the acyl radical of a saturated fatty acid with from 2 to 10 carbon atoms
$R^2$ is the acyl radical of a saturated fatty acid with from 4 to 10 carbon atoms, and
The sum of the carbon atoms in $R^1+R^2$ is at least 6 and not greater than 18.

3. A plastic composition comprising a polyvinyl chloride-acetate resin and as a plasticizer therefor a hexide diester of the type

wherein

H is the divalent hexide residue ($C_6H_8O_4$)
$R^1$ is the acyl radical of a saturated fatty acid with from 2 to 10 carbon atoms
$R^2$ is the acyl radical of a saturated fatty acid with from 4 to 10 carbon atoms, and
The sum of the carbon atoms in $R^1+R^2$ is at least 6 and not greater than 18.

4. A plastic composition comprising a polyvinyl butyral resin and as a plasticizer therefor a hexide diester of the type

wherein

H is the divalent hexide residue ($C_6H_8O_4$)
$R^1$ is the acyl radical of a saturated fatty acid with from 2 to 10 carbon atoms
$R^2$ is the acyl radical of a saturated fatty acid with from 4 to 10 carbon atoms, and
The sum of the carbon atoms in $R^1+R^2$ is at least 6 and not greater than 18.

5. A plastic composition comprising a resin selected from the group consisting of polyvinyl chloride, polyvinyl chloride-acetate, and polyvinyl butyral, and as a plasticizer for said resin a sorbide diester of the type

wherein

H is the divalent sorbide residue ($C_6H_8O_4$)
$R^1$ is the acyl radical of a saturated fatty acid with from 2 to 10 carbon atoms
$R^2$ is the acyl radical of a saturated fatty acid with from 4 to 10 carbon atoms, and
The sum of the carbon atoms in $R^1+R^2$ is at least 6 and not greater than 18.

6. A plastic composition comprising a resin selected from the group consisting of polyvinyl chloride, polyvinyl chloride-acetate, and polyvinyl butyral, and as a plasticizer for said resin a mannide diester of the type

wherein

H is the divalent mannide residue ($C_6H_8O_4$)
$R^1$ is the acyl radical of a saturated fatty acid with from 2 to 10 carbon atoms
$R^2$ is the acyl radical of a saturated fatty acid with from 4 to 10 carbon atoms, and
The sum of the carbon atoms in $R^1+R^2$ is at least 6 and not greater than 18.

7. A plastic composition comprising a polyvinyl chloride resin and a hexide di-octoate as a plasticizer for said resin.

8. A plastic composition comprising a polyvinyl chloride resin and sorbide di-octoate as a plasticizer for said resin.

9. A plastic composition comprising a polyvinyl chloride-acetate resin and a hexide di-pelargonate as a plasticizer for said resin.

10. A plastic composition comprising a polyvinyl chloride-acetate resin and sorbide di-pelargonate as a plasticizer for said resin.

RUDOLPH M. GOEPP Jr.